(12) United States Patent
Maeda et al.

(10) Patent No.: US 8,063,387 B2
(45) Date of Patent: Nov. 22, 2011

(54) RADIATION IMAGE CONVERSION PANEL

(75) Inventors: Keiko Maeda, Hachioji (JP); Tetsuo Shima, Akishima (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 84 days.

(21) Appl. No.: 12/449,931

(22) PCT Filed: Mar. 11, 2008

(86) PCT No.: PCT/JP2008/054371
§ 371 (c)(1),
(2), (4) Date: Sep. 3, 2009

(87) PCT Pub. No.: WO2008/114649
PCT Pub. Date: Sep. 25, 2008

(65) Prior Publication Data
US 2010/0051837 A1    Mar. 4, 2010

(30) Foreign Application Priority Data

Mar. 16, 2007 (JP) .................................. 2007-068252

(51) Int. Cl.
*G03B 42/08* (2006.01)

(52) U.S. Cl. .................................................. 250/484.4
(58) Field of Classification Search ............... 250/484.4, 250/580
See application file for complete search history.

(56) References Cited

U.S. PATENT DOCUMENTS

| 4,891,520 A | 1/1990 | Ishibashi et al. |
| 2007/0040129 A1 | 2/2007 | Maeda |

FOREIGN PATENT DOCUMENTS

| JP | 06-299150 A | 10/1994 |
| JP | 2005-024272 A | 1/2005 |

*Primary Examiner* — Dave Porta
*Assistant Examiner* — Mark R Gaworecki
(74) *Attorney, Agent, or Firm* — Holtz, Holtz, Goodman & Chick, PC (57) ABSTRACT

Disclosed is a radiation image conversion panel containing a support having thereon a phosphor layer containing an alkali metal halide phosphor which is deposited on the support by a gas phase accumulation method, wherein the alkali metal halide phosphor includes a columnar crystal and an existing ratio of an activation agent of the columnar crystal on a surface of the columnar crystal to an inner portion of the columnar crystal is from 0.7 to 20.

10 Claims, 1 Drawing Sheet

RADIATION IMAGE CONVERSION PANEL

This application is the United States national phase application of International Application PCT/JP2008/054371 filed Mar. 11, 2008.

TECHNICAL FIELD

The present invention relates to a radiation image conversion panel.

BACKGROUND ART

A conventional radiation image conversion panel containing a stimulable phosphor layer prepared by a gas phase accumulation method has a columnar crystal in the phosphor layer. Since this type of radiation image conversion panel contains no binder resin, there are formed spaces between one columnar crystal and other columnar crystals. Therefore, diffusion of an excitation light can be prevented and improvement of a taking out efficiency of an emitting light can be achieved, which results in obtaining an image of high luminance and high sharpness.

However, this radiation image conversion panel has a problem of easily deteriorating during storage because it contains no binder, and as a result, the surface of the phosphor is exposed. It was needed to figure out a way such as surface treatment and lamination to avoid contact with the outside air as much as possible.

Even though the performance degradation as a product can be prevented, unlike the inner portion of a crystal, the surface and the side of the phosphor crystal basically prepared by a gas phase accumulation method are placed under various environmental conditions in the processes from vapor deposition to sealing.

For example, during the vapor deposition process, there are factors such as vacuum atmosphere, change of a temperature and adsorption and desorption of an inert gas. And during the subsequent processes, there are factors caused by a surface treatment and influences of water in the atmosphere. Thereby, there was a problem that a content of an activating agent tends to be different between the surface and the inner portion of the crystal.

Moreover, about the surface state of the phosphor crystal, which seems to have an important role on performance of the phosphor, there have been disclosed very limited reports until now. There was disclosed only a report in which a ratio of Cs and C was specified (for example, refer to Patent Document 1). The purpose of this disclosure is to decrease contamination on the crystal surface and this differs from the present invention in that it is not an investigation of a distribution of an activating agent concentration.

Patent Document 1: JP-A 2005-24272

DISCLOSURE OF THE INVENTION

Problems to be Solved by the Invention

The present invention was achieved by taking consideration of the above-described problems. An object of the present invention is to provide a radiation image conversion panel exhibiting high luminance and high sharpness.

Means to Solve the Problems

The aforesaid object of the present invention can be achieved by the following constitutions.

1. A radiation image conversion panel comprising a support having thereon a phosphor layer containing an alkali metal halide phosphor which is deposited on the support by a gas phase accumulation method, wherein the alkali metal halide phosphor comprises a columnar crystal and an existing ratio of an activation agent of the columnar crystal on a surface of the columnar crystal to an inner portion of the columnar crystal is from 0.7 to 20.

2. A radiation image conversion panel comprising a support having thereon a phosphor layer containing an alkali metal halide phosphor which is deposited on the support by a gas phase accumulation method, wherein the alkali metal halide phosphor comprises a columnar crystal and the columnar crystal has a luminance distribution by cathode luminescence in the range of 50 or less.

3. A radiation image conversion panel comprising a support having thereon a stimulable phosphor layer containing an alkali metal halide phosphor which is deposited on the support by a gas phase accumulation method, wherein the alkali metal halide phosphor comprises a columnar crystal and an existing ratio of an activation agent of the columnar crystal on a surface of the columnar crystal to an inner portion of the columnar crystal is from 0.7 to 20.

4. A radiation image conversion panel comprising a support having thereon a stimulable phosphor layer containing an alkali metal halide phosphor which is deposited on the support by a gas phase accumulation method, wherein the alkali metal halide phosphor comprises a columnar crystal and the columnar crystal has a luminance distribution by cathode luminescence in the range of 50% or less.

5. The radiation image conversion panel described in any one of the aforesaid items 1 to 4, wherein the alkali metal halide phosphor comprises Br or I as a main halide component, and a content of F is in the range of 0 ppm to 10 ppm.

6. The radiation image conversion panel described in any one of the aforesaid items 1 to 5, wherein the alkali metal halide phosphor is a stimulable phosphor comprising CsBr:Eu (cesium bromide: Eu activating agent) as a main component.

7. The radiation image conversion panel described in any one of the aforesaid items 1 to 6, wherein the support is an organic polymer film.

Effects of the Invention

It was possible to obtain a radiation image conversion panel exhibiting high luminance and high sharpness as well as excellent in storage property by the present invention.

DESCRIPTION OF THE SYMBOLS

1: radiation image conversion panel
2: support
3: stimulable phosphor layer
4: stimulable phosphor plate
10, 20: waterproofing protective film
41: vacuum chamber
42: evaporation source 43: support holder
44: support rotation shaft
14a: support rotation mechanism
15: vacuum pump
30: vapor deposition apparatus

PREFERRED EMBODIMENTS TO CARRY OUT
THE INVENTION

In the present invention, it was possible to produce a radiation image conversion panel exhibiting high luminance and high sharpness as well as excellent in storage property by realizing a constitution described in any one of the aforesaid items 1 to 5.

Each of the constitutional components of the present invention will be detailed in the followings.

The present embodiments will now be described with reference to FIG. 1 which shows one of the embodiments of a radiation image conversion panel of the present invention.

Figure 1:
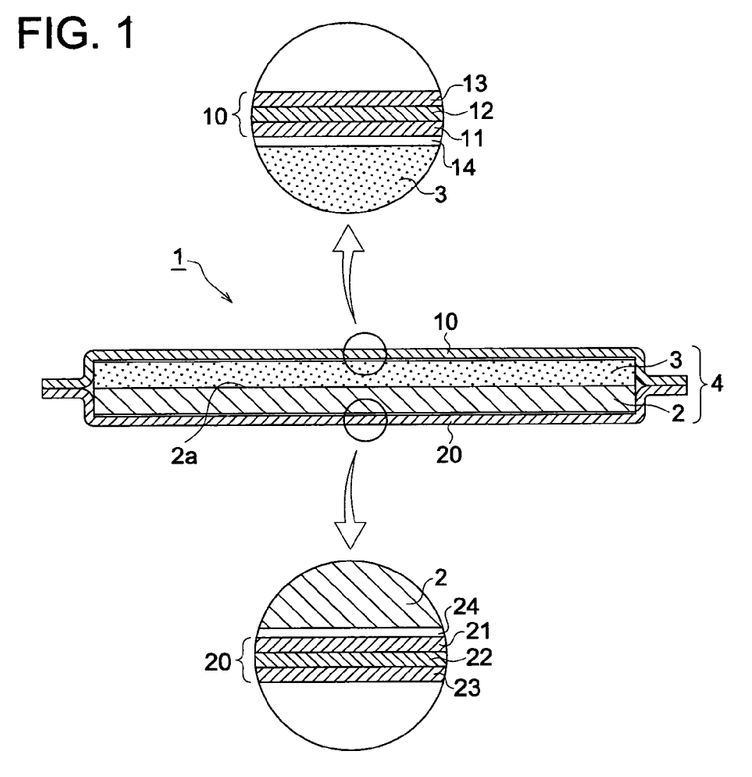
FIG. 1 is a cross-sectional view showing one of the embodiments of a radiation image conversion panel of the present invention.

FIG. 1 is a cross-sectional view showing one of the embodiments of the radiation image conversion panel of the present invention. As is show in FIG. 1, a radiation image conversion panel 1 contains a phosphor plate 4 in which a stimulable phosphor layer 3 containing an alkali metal halide phosphor is produced on a support 2.

The support 2 has a rectangular shape. The support 2 is composed of a polymer, a glass or a metal. Specific examples of them are: an organic polymer film (for example, cellulose acetate film, polyester film, polyethylene terephthalate, polyamide film, polyimide film, triacetate film and polycarbonate film); a glass plate (for example, quartz, borosilicate glass and chemically strengthen glass); a metal sheet (for example, aluminium, iron, copper and chromium); and a metal sheet having a coated layer made of a metal oxide thereof. Among them, a most preferably used is an organic polymer film from the viewpoint of transmittance of X rays and cutting appropriateness.

A surface 2a (the upper side in FIG. 1) of the support 2 may be a smooth surface or may be a matt surface. The surface 2a (the upper side in FIG. 1) of the support 2 may be a matt surface in order to improve adhesion with a stimulable phosphor layer 3, and further, the surface 2a may be provided with a subbing layer in order to improve adhesion with a stimulable phosphor layer 3. Moreover, the surface 2a may be provided with a light reflective layer (not shown in the figure) on it in order to prevent the exciting light from entering in the stimulable phosphor layer 3 through the support 2.

The stimulable phosphor layer 3 is preferably composed of at least one layer structure. The thickness of the layer is preferably 50 μm or more, and more preferably it is in the range of 100 μm to 500 μm.

The stimulable phosphor layer 3 may contain a columnar structure composed of a plurality of columnar crystals each located having a space with each other, the columnar crystals being made of an alkali metal halide phosphor which will be described later.

<Alkali Metal Halide Phosphor>

Here, an alkali metal halide phosphor contained in the stimulable phosphor layer 3 of the radiation image conversion panel of the present invention will be described.

The present inventors have investigated the aforesaid various problems and found out that the effects of the present invention can be obtained by a phosphor having a structure of Embodiment 1 or Embodiment 2 as described below.

Namely,

Embodiment 1: an alkali metal halide phosphor deposited on a support by a gas phase accumulation method having a columnar crystal and having an existing ratio of an activation agent of the columnar crystal on a surface of the columnar crystal to an inner portion of the columnar crystal from 0.7 to 20.

Embodiment 2: an alkali metal halide phosphor deposited on a support by a gas phase accumulation method having a columnar crystal and exhibiting a luminance distribution by cathode luminescence in the range of 50% or less.

Here, an alkali metal halide phosphor of the present invention is prepared by a gas phase accumulation method which will be described in detail later in the portion of the production of an alkali metal halide phosphor. The following means will be detailed later in the portion describing the preparation method of an alkali metal halide phosphor: the mean to control an existing ration of an activating agent on a surface to an inner portion of the phosphor to be in the range of 0.7 to 20 as described in Embodiment 1; and the mean to control a luminance distribution by cathode luminescence in the range of 50% or less as described in Embodiment 2.

First, a measuring method of an existing ratio of an activation agent of the columnar crystal on a surface of the columnar crystal/an inner portion of the columnar crystal described in Embodiment 1 will be explained.

<Measurement of an Existing Ratio of an Activation Agent in a Surface of and an Inner Portion of a Columnar Crystal>

Measurement of an existing ratio of an activation agent of a surface to an inner portion of a columnar crystal was performed using an apparatus of TRIFT-II made by Physical Electronics Co. Ltd.

Measuring processes and conditions are shown below.

(a) to expose a lateral side of a columnar crystal of an alkali metal halide phosphor by cutting it along the length direction of a columnar crystal (b) to measure the cut side of the columnar crystal with the following conditions;

primary ion species: In
acceleration voltage: 15 kV
measurement area: 60 μm square
measurement time: 3 minutes.

(c) a surface existing amount of an activation agent is determined as a quotient obtained from Eu secondary ion strength (Mass: 151+) by dividing Cs secondary ion strength (Mass: 133+)

(d) to make a polished side of an alkali metal halide phosphor along the length direction of a columnar crystal, the polished side is different from a lateral side obtained by cutting it and the inner portion of the columnar crystal is exposed by this process. A cross section polisher is used for polishing (SM-09010: made by Nihon Denshi Co. Ltd.; acceleration voltage: 15 kV, polishing time: 6 hours).

(e) to measure the polished side of the columnar crystal in the same manner as the process (b). From the obtained spectrum, an inner existing amount of an activation agent is determined as a quotient of a fragment strength of an activation agent divided by a fragment strength of an alkali metal.

A value obtained from a surface existing amount of an activation agent divided by an inner existing amount of an activation agent is defined as an existing ratio of an activation agent of a surface to an inner portion.

That is, (Existing ratio of an activation agent of a surface/an
inner portion) =[(a surface existing amount of an
activation agent)/(inner existing amount of an
activation agent)]×100(%).

Subsequently, measurement of a luminance distribution by cathode luminescence will be explained.

<Measurement of Luminance Distribution by Cathode Luminescence>

Measurement of a luminance distribution by cathode luminescence of an alkali metal halide is done by using JSM-7000F (made by Nihon Denshi Co. Ltd.) and MP-32 (made by HORIBA Corporation).

Measuring processes and conditions are shown below.

The space between alkali metal halide phosphors is embedded with a pretreatment resin, and then a polished plane parallel to the surface of the support was made using a cross section polisher.

The formed polished plane was subjected to measurement using JSM-7000F and MP-32 with the following conditions.

Conditions of JSM-7000F;

Magnifying power: 5000 times

Acceleration voltage: 3 kV

Electronic current to sample: scanning with 2 nA

Conditions of MP-32;

Taking in positions: 640 points

Dual time: 2 millisecond/point, mapping at 440 nm.

A variation coefficient for the luminance at each of the measurement points was obtained and defined as a luminance distribution by cathode luminescence.

Further, it was found that the effects of the present invention can be more effectively obtained by the alkali metal halide phosphor comprising Br or I as a main halide component, and at the same time, a content of F is in the range of 0 ppm to 10 ppm.

(Measurement of a Content of a Main Halide Component and F in a Phosphor)

Identification of a main halide component in a phosphor (here, "a main component" indicates a component contained in an amount of 50 mass % or more of the total halide in a phosphor) was done, and a quantitative determination of F in a total halide was measured.

The measuring conditions of an ion chromatograph are shown below.

A quantitative measurement of a main component was done as follows. An amount of 100 mg of a sample was taken and ultra pure water was added to become a solution of 100 ml, then, further ultra pure water was suitably added to dilute the solution. Thus prepared aqueous solution was subjected to an anion gradient analysis using DX-500 made by DIONEX Corporation.

A quantitative measurement of F was done as follows. An amount of 250 mg of a sample was taken and ultra pure water was added to become a solution of 25 ml. Then, a disturbing Br element for the measurement was eliminated using a solid phase cartridge (OnGuard-Ag, made by DIONEX Corporation).

Afterward, the prepared aqueous solution was subjected to an anion gradient analysis using DX-500 made by DIONEX Corporation.

Measuring conditions were as follows.

Ion chromatography: DX-500 made by DIONEX Corporation

Separation column: IonPac AS11 made by DIONEX Corporation

Guard column: IonPac AG11 made by DIONEX Corporation

Eluant: A; ultra pure water

B; 100 mM of NaOH

|  | Time (minutes) | | | | | |
| --- | --- | --- | --- | --- | --- | --- |
|  | 0 | 1 | 5 | 15 | 25 | 35 |
| A(%) | 99 | 99 | 98 | 88 | 70 | 70 |
| B(%) | 1 | 1 | 2 | 12 | 30 | 30 |

Flow rate: 1 ml/minute

Suppressor: ASRS-ULTRA (300 mA)

Mode: external mode

Regeneration liquid: ultra pure water (liquid transfer by high-pure nitrogen at 10 psi)

Detection: detection with electron conductivity

<Compound Represented by Formula (1)>

An alkali metal halide phosphor (it is also called as a stimulable phosphor) of the present invention is preferably a compound represented by the following Formula (1).

$$M^1X \cdot aM^2X'_2 \cdot bM^3X''_3 : eA \qquad \text{Formula (1)}$$

Wherein, $M^1$ represents an alkali metal atom selected from Li, Na, K, Rb and Cs, preferably an alkali metal atom selected from K, Rb and Cs, and most preferably it is Cs.

$M^2$ represents a divalent metal atom selected from Be, Mg, Ca, Sr and Ba, Zn, Cd, Cu and Ni, and specifically preferred is a divalent metal atom selected from Be, Mg, and Ca, Sr and Ba.

$M^3$ represents a trivalent metal atom selected from Sc, Y, La, Ce, Pr, Nd, Pm, Sm, Eu, Gd, Tb, Dy, Ho, Er, Tm, Yb, Lu, Al, Ga and In, and specifically preferred is a trivalent metal atom selected from Y, La, Ce, Sm, Eu, Gd, Lu, Al, Ga and In.

X, X', and X" each represent a halogen atoms selected from F, Cl, Br and I. Specifically, X is a halogen atom selected from Br and I.

A represents a metal atom selected from Eu, Tb, In, Ga, Cs, Ce, Tm, Dy, Pr, Ho, Nd, Yb, Er, Gd, Lu, Sm, Y, Tl, Na, Ag, Cu and Mg, and specifically preferred is a metal atom selected from Eu, Cs, Sm, Tl and Na.

a, b, and e each respectively represent a numerical value in the range of $0 \leq a < 0.5$, $0 \leq b < 0.5$, and $0 \leq e \leq 0.2$, and especially, as for b, it is preferable that the range of $0 \leq b \leq 10^{-2}$ is satisfied.

<Compound Represented by Formula (2)>

Among the compounds represented by Formula (1), a compound represented by Formula (2) is preferable. And most preferable compound is a compound represented by CsBr:Eu.

$$CsX:A \qquad \text{Formula (2)}$$

Wherein X represents F, Cl, Br, or I; and A represents Eu, In, Ga or Ce. When Eu is selected as an activating agent, X ray conversion efficiency can be improved and it is desirable.

<Production of Alkali Metal Halide Phosphor>

An alkali metal halide phosphor represented by the aforementioned Formula (1) or Formula (2) can be produced using the phosphor raw materials of (a) to (d) as examples with the production method described below.

(a) at least one, or not less than two compounds selected from LiF, LiCl, LiBr, LiI, NaF, NaCl, NaBr, NaI, KF, KCl, KBr, KI, RbF, RbCl, RbBr, RbI, CsF, CsCl, CsBr, and CsI.

(b) at least one, or not less than two compounds selected from $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$.

(c) at least one, or not less than two compounds selected from $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, SmBr3, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, $LuF_3$, $LuCl_3$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$ and $InI_3$.

(d) at least one, or not less than two metals selected from Eu, Tb, In, Ga, Cs, Ce, Tm, Dy, Pr, Ho, Nd, Yb, Er, Gd, Lu, Sm, Y, Tl, Na, Ag, Cu and Mg.

The above-described phosphor raw materials (a) to (d) are measured in an amount satisfying the range required for a, b and e in Formula (1) and then they are mixed with pure water. It may be possible to fully mix using, for example, a mortar, a ball mill, or a mixer mill.

Next, after adding a predetermined amount of acid so that the pH value C of the obtained mixed-solution is adjusted to be $0<C<7$, water is evaporated.

Then, the obtained raw material mixture is loaded in a heat-resisting container such as a quartz crucible or an alumina crucible, and it is calcined in an electric furnace. A preferred burning temperature is from 500° C. to 1,000° C., and although a preferred burning time depends on a loaded amount of the raw materials and a burning temperature, the range of 0.5 hours to 6 hours is preferable.

Examples of a preferable calcination atmosphere are: a nitrogen gas atmosphere containing a small amount of hydrogen gas; a weakly reducing atmosphere such as a carbon dioxide atmosphere containing a small amount of carbon monoxide; a neutral atmosphere such as a nitrogen gas atmosphere or a argon gas atmosphere; and a weakly oxidizing atmosphere containing a little amount of oxygen gas.

Further, the emitted light luminescence of a photostimulable phosphor can be raised by applying the following processes. Once the raw material mixture is calcined under the above-described conditions, then the calcined product is taken out from the electric furnace and it is pulverized. Then, the calcined powder is again loaded in a heat-resisting container and put into the electric furnace to burn it again under the same conditions as previously described. Moreover, although a desired photostimulable phosphor can be obtained by taking out the calcined material from an electric furnace and cooling it in the air when cooling it from a burning temperature to a room temperature, it may be possible to cool it under the same conditions of a weakly reducing atmosphere, a neutral atmosphere, or a weakly oxidizing atmosphere as applied during calcination.

Moreover, the emitted light luminescence of the photostimulable phosphor can be further raised by moving a calcined material to a cooling portion from a heating portion within an electric furnace, and then cooling it in a weakly reducing atmosphere, a neutral atmosphere, or a weakly oxidizing atmosphere.

A stimulable phosphor layer 3 in FIG. 1 is produced by using the aforesaid alkali metal halide phosphor. A phosphor plate 4 is composed of a stimulable phosphor layer 3 and a support 2.

Here, an alkali metal halide phosphor of the present invention is produced with a gas phase accumulation method which will be described later. As a means to control an existing ratio of surface/inner portion of an activating agent to be in the range of 0.7 to 20 as described in Embodiment 1, and as a means to control a luminance distribution by cathode luminescence to be in the range of 50% or less as described in Embodiment 2, there are known several methods. Examples of a controlling means are to optimize the process conditions for evaporation of a phosphor, and to apply a post-treatment after evaporation.

It may be a method of introducing a halogen gas and directly substituting with a halogen, or it may be a method of releasing a halogen by heating a halogen releasing agent and then substituting with a halogen.

Examples of a halogen gas used are, HCl, HBr and HI. Since these gases are very corrosive, a special container is required for using these gases. Usable examples of a halogen releasing agent are all of the compounds which release a halogen by applying heat to them.

Specific examples of these are a hydrocarbon compound in which at least one of a hydrogen atom is substituted with a halogen atom of Cl, Br or I.

The aforesaid halogen releasing agents may be a compound only containing saturated bonds between elements consisting of the structure, or it may be a compound containing an unsaturated bond. It may be a cyclic compound or a chained compound. Further, it may be a compound in which an atom or a molecule in the compound is substituted with a hydroxyl group, an ether group, or a carboxyl group.

As a means for Embodiment 1, it was found that a post-treatment is specifically affected by pressure, time and a kind of gas. As a means for Embodiment 2, it was found that the effect of the vapor deposition process is specifically strong.

<Forming Method of Stimulable Phosphor>

A gas phase accumulation method is used for forming a stimulable phosphor layer containing an alkali metal halide phosphor on a support.

<Gas Phase Accumulation Method>

A gas phase accumulation method used for forming a stimulable phosphor layer of a radiation image conversion panel of the present invention will be described.

There are known an (vacuum) vapor deposition method, a sputtering method and a CVD method as applicable methods to deposit in a gas state an alkali metal halide phosphor of the present invention on a support.

(Vapor Deposition Method)

a Vapor Deposition Method has the Following Processes: to set up a support in a vapor deposition apparatus, then to evacuate the inner portion of the apparatus so as to make a vacuum degree of about $1.333 \times 10^{-4}$ Pa; then to deposit a stimulable phosphor on a surface of a support to become a predetermined thickness by heating to evaporate one of the stimulable phosphor with a method such as a resistance heating method or a electron beam method.

By the aforesaid method, a stimulable phosphor layer having no binder is produced. A plurality of stimulable phosphor layers can be produced by dividing the aforesaid vapor deposition process into multiple processes.

In addition, in the aforesaid vapor deposition process, it is possible to carry our evaporation deposition by using a plurality of resistance heaters or electron beams.

In the vapor deposition method used in the present invention, it is possible to heat stimulable phosphor evaporation sources with a plurality of resistance heaters or electron beams so as to vapor deposit them on a support (it is also called as a substrate) where an aimed stimulable phosphor is synthesized and at the same time a stimulable phosphor layer is produced.

Moreover, in the vapor deposition method, the support may be cooled or heated according to the necessity. After the completion of vapor deposition, the formed stimulable phosphor layer may be subjected to a heating treatment.

(Sputtering Method)

A sputtering method is conducted as follows: in the similar way as in the aforesaid vapor deposition method, to set up a support in a sputtering apparatus, then to evacuate the inner portion of the apparatus to become once a vacuum degree of about $1.333 \times 10^{-4}$ Pa; then to introduce an inert gas such as Ar or Ne used a sputtering gas into the apparatus so as to make a vacuum degree of about $1.333 \times 10^{-1}$ Pa.

Subsequently, a stimulable phosphor is deposited on a surface of a support (a substrate) to become a predetermined thickness by sputtering a target of an alkali metal halide phosphor. In this sputtering process, like as the vapor deposition process, a plurality of stimulable phosphor layers can be produced by dividing the aforesaid sputtering process into multiple processes. The stimulable phosphor layers can be produced by sputtering each of the targets simultaneously or sequentially.

In addition, in the sputtering method, it is possible to use a plurality of stimulable phosphor evaporation sources as targets, and it is possible to form an aimed stimulable phosphor layer on a support (a substrate) by sputtering the targets simultaneously or sequentially. A reactive sputtering may be conducted after introduction of a gas such as $O_2$ or $H_2$ when needed. Further, in the sputtering method, the support may be cooled or heated according to the necessity. After the completion of sputtering, the formed stimulable phosphor layer may be subjected to a heating treatment.

(CVD Method)

A CVD method enables to produce a stimulable phosphor layer having no binder on a support (substrate) by applying energy such as heat or high frequency electric power to an aimed alkali metal halide phosphor (also called as a stimulable phosphor) or to an organic metal compound containing an alkali metal halide phosphor (a stimulable phosphor) as an evaporation source in order to decompose it. It is possible to produce a stimulable phosphor layer in which a plurality of long columnar crystals each independently has a specific angle against a normal line of the support is vapor grown.

The layer thickness of the stimulable phosphor layer produced by the above-mentioned method varies depending on an aimed sensitivity of a radiation image conversion panel toward radiation rays, and on a kind of the stimulable phosphor. However, a preferable layer thickness is in the range of 10 μm to 1000 μm, and a more preferable layer thickness is 20 μm to 800 μm.

<Vapor Deposition Apparatus>

Figure 2:
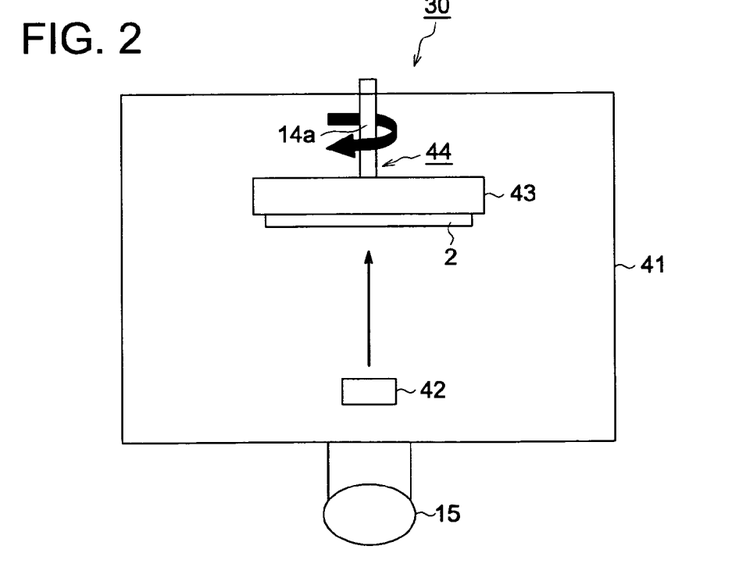
FIG. 2 is a cross-sectional view showing a schematic constitution of an example of an vapor deposition apparatus used in the present invention.

In order to apply the aforesaid vapor deposition method, a vapor deposition apparatus such as shown in FIG. 2 can be suitably used in the present invention.

As is shown in FIG. 2, a vapor deposition apparatus 30 is provided with the followings: a vacuum chamber 41; in an inside of the vacuum chamber 41, an evaporation source 42 which vapor deposits an alkali metal halide phosphor by heating to evaporate or sublimate it on a support 2; a support holder 43 to hold the support 2; a support rotation mechanism 14a which rotates the support holder 43 with respect to the evaporation source 42; and a vacuum pump 15 which evacuates the interior of the vacuum chamber 41 and introduces an air therein.

In the vapor deposition apparatus 30, it is possible to produce a stimulable phosphor layer 3 by vapor depositing the vapor of the evaporation source 42 on the support 2 while rotating the support holder 43 using the support rotation mechanism 14a.

The evaporation source 42 contains an alkali metal halide phosphor in it and it is applied heat with a resistance heating method. Therefore it may be composed of a crucible made of alumina around which a heater is wound, or, it may be composed of a boat or a heater made of a metal having a high melting point.

As for the heating methods of an alkali metal halide phosphor, heating with an electron beam or high frequency wave induction may be applied other than resistance heating. In the present invention, a resistance heating method is preferable from the view points of easy handling with a relatively simple composition, low price, and enabling a wide range of application to a variety of materials.

The evaporation source 42 may be a molecular beam source using a molecular beam epitaxial method.

In order to control the vacuum degree, an inert gas such as Ar or He is preferably used (the figure not shown).

Further, a shutter (the figure not shown) may be provided between the support 2 and the evaporation source 42 so as to intercept the space locating between the evaporation source 42 and the support 2.

By proving a shutter, it is possible to prevent a foreign matter which is adhered on a surface of the alkali metal halide phosphor from evaporating at an early stage of the evaporation process and adhering to the support 2.

The support holder 43 is preferably provided with a heater (the figure not shown) to heat the support 2. By heating the support 2, it is possible to make desorption and elimination of the adsorbed material on a surface of the support 2, and to prevent a layer of impurity from forming between the surface of the support 2 and the alkali metal halide phosphor layer. Thereby, it is possible to strengthen the adhesion and to control the layer quality of the stimulable phosphor layer.

The support rotation mechanism 14a is composed of, for example, a support rotation shaft 44 which holds the support holder 43 and rotates the support holder 43; and a motor (the figure not shown) which is located outside of the vacuum chamber 41 and becomes a driving source of the support rotation mechanism 14a.

<Production of Stimulable Phosphor Layer Using Vapor Deposition Apparatus>

An example of producing a stimulable phosphor layer by using the afore-mentioned vapor deposition apparatus 30 will be described. For example, a stimulable phosphor layer 3 can be produced on a support 2 in accordance with the processes shown below.

First, a support 2 is set up to a support holder 43.

Then, an inside of a vacuum chamber 41 is evacuated and a desired vacuum degree is adjusted. Thereafter, a support holder 43 is rotated with respect to an evaporation source 30 by a support rotation mechanism 14a. After the desired vacuum degree is achieved in the inside of the vacuum chamber 41, the stimulable phosphor is evaporated from the heated evaporation source 42 to grow the stimulable phosphor on the surface of the support to have a predetermined thickness.

The distance between the support 2 and the evaporation source 42 is preferably set to be in the range of 100 mm to 1,500 mm.

A plurality of stimulable phosphor layers 3 can be produced by dividing the aforesaid vapor deposition process into multiple processes. Further, in the aforesaid evaporation deposition process, it is possible to heat stimulable phosphor evaporation sources with a plurality of resistance heaters or electron beams so as to vapor deposit them together on the support 2 where an aimed stimulable phosphor is synthesized and at the same time a stimulable phosphor layer 3 is produced.

In the evaporation deposition method, the vapor deposited materials (such as the support 2, a protective layer and an inter layer) may be cooled or heated when needed during evaporation deposition.

In addition, after completion of the vapor deposition, the stimulable phosphor layer 3 may be subjected to a heating treatment. In the vapor deposition method, a reactive vapor deposition may be conducted after introduction of a gas such as $O_2$ or $H_2$ when needed.

When the stimulable phosphor layer 3 is produced by the aforesaid gas phase accumulation method, the temperature of the support on which the stimulable phosphor layer 3 is produced is preferably from a room temperature (designated as rt, and it is about 24° C.) to 300° C., and more preferably it is from 50° C. to 200° C.

A preferable vacuum degree P is $1.0 \times 10^{-3}$ Pa$<$P$<5.0 \times 10^{-1}$ Pa, and more preferably it is $3.0 \times 10^{-3}$ Pa$<$P$<3.0 \times 10^{-1}$ Pa.

As described above, the stimulable phosphor layer 3 containing an alkali metal halide phosphor is produced, and the stimulable phosphor layer 3 and the support 2 can compose a phosphor plate 4.

<Protective Layer>

A protective layer used for a radiation image conversion panel of the present invention will be described by referring to FIG. 1.

In FIG. 1, a protective layer is placed for the purpose of protecting the phosphor plate 4 of a radiation image conversion panel 1.

The protective layer contains two sheets of waterproofing protective films. As is shown in FIG. 1, the phosphor plate 4 stands between a first waterproofing protective film 10 which is located at the upper side of the stimulable phosphor layer 3 and a second waterproofing protective film 20 which is located at the underside of the support 2.

The first waterproofing protective film 10 is not substantially adhered to the stimulable phosphor layer 3 of the phosphor plate 4, and the peripheral part of the first waterproofing protective film 10 is extended out of the sides of the phosphor plate 4.

"The first waterproofing protective film 10 is not substantially adhered to the stimulable phosphor layer 3" designates a state that the first waterproofing protective film 10 and the stimulable phosphor layer 3 are not unified from the optical viewpoint. More specifically, it is a state in which a contacting area of the first waterproofing protective film 10 with the stimulable phosphor layer 3 is 10% or less based on the total area of the stimulable phosphor layer 3 (the side which faces to the first waterproofing protective film 10).

On the other hand, the peripheral part of the second waterproofing protective film 20 is also extended out of the sides of the phosphor plate 4.

In the radiation image conversion panel 1, the first and the second waterproofing protective films 10 and 20 are fused at all of the peripheral portions. The first and the second waterproofing protective films 10 and 20 make a structure of entirely sealing the phosphor plate 4.

The first and the second waterproofing protective films 10 and 20 can surely prevent water from entering into the phosphor plate 4 and protect the aforementioned phosphor plate 4 by entirely sealing the phosphor plate 4.

The waterproofing protective film used in the present invention is preferably provided with the following properties in order to surely prevent water penetration into the phosphor plate: an oxygen transmittance is preferably $1 \times 10^{-3}$ ml/(m$^2$·24 h·MPa) or less measured by the method based on JIS K 7126-1987; and a water vapor transmittance is preferably $1 \times 10^{-3}$ g/(m$^2$·24 h) or less at 25±0.5° C. and under relative humidity of (90±2)% RH, measured by the method based on JIS K 7129-1992.

As is shown in the upper magnified view of FIG. 1, the first waterproofing protective film 10 has a laminated structure composed of three layers of a first layer 11, a second layer 12 and a third layer 13.

The first layer 11 faces to the stimulable phosphor layer 3 of the phosphor plate 4 through an air layer 14, the first layer is composed of a resin having a thermally fusing property. Examples of "a resin having a thermally fusing property" includes: ethylene-vinyl acetate copolymer (EVA); a casting polypropylene (CPP); and polyethylene (PE).

The second layer 12 is a layer composed of a metal oxide such as alumina or silica. It is vapor deposited under the third layer 13 with a conventionally known vapor deposition method. The second layer 12 is used to strengthen the waterproofing property of the first waterproofing protective film 10.

The third layer 13 is laminated on the second layer 12 and it is composed of a resin such as polyethylene terephthalate (PET).

Thus described, the first waterproofing protective film 10 having the second layer 12 composed of a metal oxide has an advantage of easy workability and high transparence. For this reason, it is hard to be affected with respect to the waterproofing property and oxygen permeability by the effects of temperature or humidity. Therefore, the aforesaid first waterproofing protective film 10 is suitably used for a medical use radiation image conversion panel 1 using a stimulable phosphor to which a stable image quality is required regardless of the environment change.

Moreover, on the above of the third layer 13, it may be laminated further one or two or more layers selected from the followings: the similar layer as the first layer 11, the similar layer as the second layer 12 or the similar layer as the third layer 13; or a layer composed of a different resin from that of the first layer 11 or the third layer 13.

Especially when the similar layer as the second layer 12 composed of a metal oxide such as alumina or silica is laminated on the third layer 13, the first waterproofing protective film 11 will exhibit a preferable waterproofing property which corresponds to the number of laminated layers of the second layer 12.

The lamination method of the second layer 12 or the similar layer thereof is not specifically limited and any conventional method can be applied. It is preferable to apply a dry lamination method by considering the operation easiness.

As is shown in the lower magnified view of FIG. 1, the second waterproofing protective film 20 has a laminated structure composed of three layers of a first layer 21, a second layer 22 and a third layer 23.

The first layer 21 faces to the support 2 of the phosphor plate 4 through an air layer 24.

The first layer 21 is composed of the similar resin contained in the first layer 11 of the first waterproofing protective film 10. At the peripheral portion of the first layer 21 is fused to the first layer 11 of the first waterproofing protective film 10.

The second layer 22 is a layer laminated under the first layer 21, and composed of aluminium. The second layer 22 is used to strengthen the waterproofing property of the second waterproofing protective film 20.

The third layer 23 is laminated under the second layer 22, and composed of a resin such as PET.

Moreover, under the third layer 23, it may be laminated further one or two or more layers selected from the followings: the similar layer as the first layer 21, the similar layer as the second layer 22 or the similar layer as the third layer 23; or a layer composed of a different resin from that of the first layer 11 or the third layer 13.

EXAMPLES

The present invention will now be specifically described with reference to examples. However, the embodiments of the present invention are not limited thereto.

Example 1

<Production of Radiation Image Conversion Panel 1>

An alkali metal halide phosphor (CsBr: 0.0005 Eu) was vapor deposited on one surface of a support of polyimide having a thickness of 200 μm, and a stimulable phosphor layer was produced.

The vapor deposition apparatus 30 as is shown in FIG. 2 was employed for vapor deposition.

An alkali metal halide phosphor (CsBr: 0.0005 Eu) was used as a vapor depositing material, and it was loaded in an indirect heating crucible used as an evaporation source 42. A support 2 (also called as a substrate) was set to a rotatable support holder 43, and the distance between the support 2 and the evaporation source 42 was adjusted to be 500 mm.

The inner portion of the vapor deposition apparatus was once evacuated, and then an Ar gas was introduced in it to control the vacuum degree to be $5.0 \times 10^{-3}$ Pa. Then the support 2 (substrate) was heated to keep a temperature as shown in Table 1 while rotating the support at a speed of 10 rpm.

Subsequently, the alkali metal halide phosphor was evaporated to deposit it by heating the indirect heating crucible used as an evaporation source 42. The vapor deposition was terminated when the thickness of the phosphor layer became 120 μm.

The vapor deposition rates described in Table 1 were controlled by adjusting the opening space of the boat.

Immediately after termination of the vapor deposition, the support deposited the alkali metal halide phosphor on it was placed in a conventional thermostatic chamber and it was left under a gas atmosphere (when a solid was used, the solid was contained in a heat-resisting container and it was placed in the thermostatic chamber like as the phosphor plate), at a temperature and time as are shown in the following Table 1.

The "pressured and heated" shown in Table 1 indicates a condition of controlling the pressure to be 506 kPa.

The obtained phosphor layer after being treated as described above was quickly faced with a CCP (a casting polypropylene) layer in a first waterproofing protective film, and on the other side of the support having the phosphor layer was faced with a CCP (a casting polypropylene) layer in a second waterproofing protective film. Then by keeping this configuration, the first and the second waterproofing protective films were superimposed with each other.

While the pressure in the space enclosed by the first and the second waterproofing protective films was reduced, the peripheral portions of the first and the second waterproofing protective films were fused with an impulse sealer. The support having thereon the alkali metal halide phosphor (it is called as a phosphor plate) was sealed in the first and the second waterproofing protective films, and thus, the radiation image conversion panel 1 was produced.

<Existing Ratio of an Activation Agent of a Surface/an Inner Portion>

Measurement of an existing ratio of an activation agent of a surface to an inner portion of an alkali metal halide phosphor was performed using the aforesaid apparatus of TRIFT-II made by Physical Electronics Co. Ltd. Here, the measurement was done by suing Cs secondary ion strength (Mass: 133+) instead of Eu secondary ion strength (Mass: 151+).

<Luminance Distribution by Cathode Luminescence>

Measurement of a luminance distribution by cathode luminescence of an alkali metal halide is done by using the aforesaid JSM-7000F (made by Nihon Denshi Co. Ltd.) and MP-32 (made by HORIBA Corporation).

Measuring processes and conditions were the same as described above.

<Light Emitting Luminance>

The light emitting luminance was evaluated according to the following method.

Each sample was irradiated with X rays emitted at a tube voltage of 80 kV on the reverse side of the sample (on the side on which a stimulable phosphor was not produced). Then, a semiconductor laser was scanned on the surface of the sample (on the side on which a stimulable phosphor was produced) so as to excite the stimulable phosphor layer. The amount of a stimulated emission light (light strength) emitted from each of the stimulable phosphors was measured using a photoreceptor (a photoelectron image multiplier having a spectrum sensitivity S-5) and the measured value was designated as "a luminance (a light emitting luminance)". The measurement results are listed in Table 1.

The value of a luminance (a light emitting luminance) shown in Table is a relative value when the luminance of the radiation image conversion panel 1 is determined to be 100.

<Sharpness>

Sharpness is evaluated according to the following method.

Each sample was irradiated through a MTF chart made of lead with X rays of a tube voltage of 80 kV on the reverse side of the sample (on the side on which a stimulable phosphor was not produced). Then, a semiconductor laser was scanned on the surface of the sample (on the side on which a stimulable phosphor was produced) so as to excite the stimulable phosphor layer. The amount of a stimulated emission light (light strength) emitted from each of the stimulable phosphors was received by a photoreceptor (a photoelectron image multiplier having a spectrum sensitivity S-5) and transformed it into an electronic signal. The obtained electronic signal was further converted from an analog to a digital signal and recorded it into a hard disk.

The MTF (Modulation Transfer Function) of the recorded X ray image information stored in the hard disk was calculated by analyzing the record with a computer. The obtained results are shown in Table 1.

The sharpness (MTF) evaluation shown in Table is a relative value when the sharpness of the radiation image conversion panel 1 is determined to be 100.

<Aging Characteristics>

The light emitting luminance and the sharpness were measured immediately after production of the sample and also they were measured after leaving the sample to conditions of 23° C., 80% RH for 6 hours. The light emitting luminance and the sharpness of each sample were shown as a relative value when the sharpness of the radiation image conversion panel 1 is determined to be 100.

TABLE 1

| Sample | Support | Vapor deposition rate (μm/minute) | Temperature of support (°C.) | Treatment of phosphor | *1 | Luminance distribution in cathode luminescence | Immediate properties *2 | *3 | Aging properties *2 | *3 | Remarks |
|---|---|---|---|---|---|---|---|---|---|---|---|
| 1 | PI | 5 | 140 | Br₂ gas (150° C./4 H) | 3 | 52 | 100 | 100 | 80 | 80 | Inv. |
| 2 | PI | 1.5 | 80 | Br₂ gas, pressured and heated (140° C./4 H) | 0.6 | 43 | 100 | 102 | 83 | 88 | Inv. |
| 3 | PI | 1.5 | 80 | Air, heated (160° C./2 H) | 21 | 48 | 100 | 105 | 83 | 80 | Inv. |
| 4 | PI | 3 | 100 | N₂, pressured and heated (160° C./4 H) | 10 | 32 | 108 | 115 | 90 | 93 | Inv. |
| 5 | PI | 3 | 100 | Cl₂ gas, heated (160° C./4 H) | 0.9 | 26 | 110 | 120 | 93 | 105 | Inv. |
| 6 | PI | 3 | 100 | I₂ gas, heated (160° C./4 H) | 1 | 24 | 112 | 118 | 110 | 108 | Inv. |
| 7 | PI | 3 | 100 | Br₂ gas, heated (160° C./4 H) | 1 | 28 | 109 | 115 | 108 | 105 | Inv. |
| 8 | PI | 3 | 100 | Air, heated (170° C./4 H) | 18 | 38 | 120 | 120 | 92 | 95 | Inv. |
| 9 | PI | 3 | 100 | Air, heated (200° C./4 H) | 28 | 52 | 85 | 90 | 50 | 58 | Comp. |
| 10 | PI | 3 | 100 | Air, heated (250° C./5 H) | 45 | 60 | 50 | 90 | 25 | 58 | Comp. |
| 11 | PI | 3 | 100 | Air, heated (100° C./16 H) | 22 | 55 | 40 | 75 | 20 | 47 | Comp. |

*1: Existing ratio of activating agent of Surface/Inner portion,
*2: Luminance,
*3: Sharpness
Inv.: Invention, Comp.: Comparison As is shown by Table 1, all of the radiation image conversion panels 1 to 6 of the present invention exhibited superior results of both luminance and sharpness to the comparative samples.

Example 2

<Production of Radiation Image Conversion Panel 2-1>
(Formation of a Scintillator Layer)

A radiation image conversion panel 2-1 was produced in a similar manner as production of a radiation image conversion panel 3 in Example 1. Namely, the vapor deposition apparatus, the production processes, an annealing treatment, and protection with waterproofing protective films were the same, but CsI: 0.003T1 was used as an alkali metal halide phosphor and it was vapor deposited on one surface of a support of polyimide having a thickness of 200 μm to form a scintillator layer (a phosphor layer).
<Production of Radiation Image Conversion Panels 2-2 and 2-3>

Radiation image conversion panels 2-2 and 2-3 were produced in the same manner as production of a radiation image conversion panel 2-1, except that the conditions of vapor deposition of a phosphor (a vapor deposition rate and a temperature of a support) were respectively changed into conditions as are shown in Table 2.

(Evaluation of Luminance)

The produced radiation image conversion panels 2-1 to 2-3 (these samples are also called as scintillator plates) were set in PaxScan (FPD: 2520 made by Varian, Inc.), and an average amount of light emission (luminance) on the entire surface of the radiation image conversion panels were evaluated in accordance with the following method. The obtained results are shown in Table 2.

The FPD was irradiated with X rays emitted at a tube voltage of 80 kVp. An average signal value obtained from the image data was designated as an amount of light emission. The amount of light emission (luminance) shown in Table 2 is a relative value when the luminance of the radiation image conversion panel 2-1 is determined to be 100.

(Evaluation of Sharpness)

The produced scintillator panel was set in PaxScan (FPD: 2520 made by Varian, Inc.), and an average value of sharpness on the entire surface of the scintillator panel was evaluated in accordance with the following method. The obtained results are shown in Table 2.

The side of radiation incident surface of the FPD was irradiated with X rays emitted at a tube voltage of 80 kVp through an MTF chart made of lead. The image data was detected and it was stored in a hard disk. The, the recorded data in the hard disk was analyzed with a computer. A modulation transfer function (MTF) of the X ray image stored in the hard disk (an MTF value at a space frequency 1 cycle per mm) was used as an indication of sharpness. In Table, the larger the MTF value, the superior is the sharpness. MTF indicates an abbreviation of Modulation Transfer Function.

The MFT values in Table 2 each are an average value obtained from the values measured at ten different points in each radiation image conversion panel (scintillator panel).

TABLE 2

| Sample | Vapor deposition of phosphor | | | Existing ratio of activating agent of Surface/Inner portion | Luminance distribution in cathode luminescence | Immediate properties | | Aging properties | | Remarks |
|---|---|---|---|---|---|---|---|---|---|---|
| | Vapor deposition rate (μm/minute) | Temperature of support (° C.) | Treatment of phosphor | | | Luminance | MTF | Luminance | MTF | |
| 2-1 | 3 | 80 | Air, heated (160° C./2 H) | 0.6 | 52 | 100 | 100 | 80 | 80 | Comp. |
| 2-2 | 3 | 200 | N$_2$, pressured and heated (160° C./4 H) | 10 | 30 | 130 | 110 | 102 | 105 | Inv. |
| 2-3 | 3 | 200 | I$_2$ gas, heated (160° C./4 H) | 2 | 35 | 135 | 116 | 105 | 107 | Inv. |

Inv.: Invention, Comp.: Comparison

As is shown by Table 2, all of the radiation image conversion panels 2-1 to 2-3 of the present invention exhibited superior results of both luminance and sharpness to the comparative samples.

The invention claimed is:

1. A radiation image conversion panel comprising a support having thereon a phosphor layer containing an alkali metal halide phosphor which is deposited on the support by a gas phase accumulation method,
wherein the alkali metal halide phosphor comprises a columnar crystal and an existing ratio of an activation agent of the columnar crystal on a surface of the columnar crystal to an inner portion of the columnar crystal is from 0.7 to 20.

2. The radiation image conversion panel of claim 1,
wherein the alkali metal halide phosphor is a stimulable phosphor.

3. The radiation image conversion panel of claim 2,
wherein the alkali metal halide phosphor is a stimulable phosphor. comprising CsBr: Eu (cesium bromide: Eu activating agent) as a main component.

4. The radiation image conversion panel of claim 1,
wherein the alkali metal halide phosphor comprises Br or I as a main halide component, and has a content of F in the range of 0 ppm to 10 ppm.

5. The radiation image conversion panel of claim 1,
wherein the support is an organic polymer film.

6. A radiation image conversion panel comprising a support having thereon a phosphor layer containing an alkali metal halide phosphor which is deposited on the support by a gas phase accumulation method,
wherein the alkali metal halide phosphor comprises a columnar crystal and the columnar crystal has a luminance distribution by cathode luminescence in the range of 50% or less.

7. The radiation image conversion panel of claim 6,
wherein the alkali metal halide phosphor is a stimulable phosphor.

8. The radiation image conversion panel of claim 7,
wherein the alkali metal halide phosphor is a stimulable phosphor comprising CsBr: Eu (cesium bromide: Eu activating agent) as a main component.

9. The radiation image conversion panel of claim 6,
wherein the alkali metal halide phosphor comprises Br or I as a main halide component, and has a content of F in the range of 0 ppm to 10 ppm.

10. The radiation image conversion panel of claim 6,
wherein the support is an organic polymer film.

* * * * *